(12) United States Patent
Dunn

(10) Patent No.: US 6,283,061 B1
(45) Date of Patent: Sep. 4, 2001

(54) TERRARIUM FILTER PLATE

(76) Inventor: Derlyn D. Dunn, 137A S. Maple, Cookeville, TN (US) 38701

( * ) Notice: Subject to any disclaimer, the term of this patent is extended or adjusted under 35 U.S.C. 154(b) by 0 days.

(21) Appl. No.: 09/524,192

(22) Filed: Mar. 13, 2000

Related U.S. Application Data

(63) Continuation-in-part of application No. 09/239,158, filed on Jan. 20, 1999, now abandoned.

(51) Int. Cl.[7] .................................................. B61L 13/04
(52) U.S. Cl. ........................... 119/246; 119/260; 119/248
(58) Field of Search ..................... 119/246, 259, 119/260, 261, 264, 248; 47/69

(56) References Cited

U.S. PATENT DOCUMENTS

| | | | | |
|---|---|---|---|---|
| 2,636,473 | * | 4/1953 | Schwartz et al. | 119/246 |
| 3,529,574 | * | 9/1970 | Kelley et al. | 119/246 |
| 3,929,101 | * | 12/1975 | Katz | 119/260 |
| 4,894,151 | * | 1/1990 | Woltmann | 210/169 |
| 4,995,334 | * | 2/1991 | Wechsler | 119/246 |
| 5,127,366 | * | 7/1992 | Kim | 119/246 |
| 5,135,400 | * | 8/1992 | Ramey | 434/297 |
| 5,234,581 | * | 8/1993 | Rosenberg | 210/151 |
| 5,269,914 | * | 12/1993 | Englert | 210/151 |
| 5,618,428 | * | 4/1997 | Oslund | 210/602 |
| 5,693,220 | * | 12/1997 | Sceusa | 210/151 |
| 5,957,085 | * | 9/1999 | Youngstrom et al. | 119/246 |

OTHER PUBLICATIONS

Tetra—Cascading Creek Viquarium: Printout from Internet.
Tetra—Water's Edge Viquarium: Printout from Internet.
Perfecto Terraset Ecosystem (advertising flyer).
Perfecto River Tank Ecosystem (advertising flyer).

* cited by examiner

Primary Examiner—Charles T. Jordan
Assistant Examiner—Judith A. Nelson
(74) Attorney, Agent, or Firm—Waddey & Patterson; David B. Pieper; Emily A. Shouse

(57) ABSTRACT

A terrarium filtering device, apparatus, and method is disclosed which includes a base filtration plate, a barrier wall, and an environment separation cup. The present invention includes a terrarium filtering system for maintaining a wet environment, a moist environment, and a dry environment within an aquarium tank. The filtering system includes a terrarium filter plate with a barrier wall to separate the wet and moist areas, water flow holes and water movers connected to a bubbling system to provide aeration and create a water flow, and a passive waste neutralization system. The terrarium filter plate is covered with a filtering media and together they act as a filtering device. Waste materials in the water are moved by flowing water to be trapped in the filtering media, and a porous passive neutralization system is used to offset toxins in the water flow.

8 Claims, 4 Drawing Sheets

TERRARIUM FILTER PLATE

This application claims benefit of co-pending Continuation-In-Part U.S. patent application Ser. No. 09/239,158 filed Jan. 20, 1999 now abandoned, entitled "Terrarium Filter Plate."

BACKGROUND OF THE INVENTION

The present invention relates generally to aquariums and more particularly to a multiple environment aquarium such as a terrarium.

Several United States Patents have been directed to various ecosystems and specifically, to aquarium filtration systems. These include U.S. Pat. No. 2,636,473, issued to Scwartz, et al., on Apr. 28, 1953; U.S. Pat. No. 3,529,574, issued to Kelly, on Sep. 22, 1970; U.S. Pat. No. 3,929,101, issued to Katz, on Dec. 30, 1975; U.S. Pat. No. 4,894,151, issued to Woltmann, on Jan. 16, 1990; U.S. Pat. No. 4,995,334, issued to Wechsler, on Feb. 26, 1991; U.S. Pat. No. 5,127,366, issued to Kim, on Jul. 7, 1992; U.S. Pat. No. 5,135,400, issued to Ramey, on Aug. 4, 1992; U.S. Pat. No. 5,234,581, issued to Rosenberg, on Aug. 10, 1993; U.S. Pat. No. 5,269,914, issued to Englert, on Dec. 14. 1993; U.S. Pat. No. 5,693,220, issued to Sceusa, on Dec. 2, 1997; and U.S. Pat. No. 5,957,085, issued to Youngstrom et al., on Sep. 28, 1999. Each of these patents will be outlined in the following discussion.

U.S. Pat. No. 2,636,473, issued to Scwartz, et al., on Apr. 28, 1953, discloses a "Water Purifying Device for Aquariums." This invention discloses an aquarium plate with communicating channels joined by cross channels and fine holes or openings for breaking up particles sucked into the channels. The plate is covered with sand and the waste particle are decomposed in the sand and drawn through the openings by a suction provided by a suction tube.

U.S. Pat. No. 3,529,574, issued to Kelly, on Sep. 22, 1970, discloses a "Corner Air Lift for Aquariums." This patent is directed towards a plate that fits into a corner of an aquarium to form a water channel. The plate has slots to allow for water flow while prohibiting animal entry. The invention is designed to utilize an air15 lift to create a water flow within the aquarium.

U.S. Pat. No. 3,929,101, issued to Katz, on Dec. 30, 1975, discloses a "Filtration and Circulation System and Apparatus Therefore." This specification discloses the use of a system for maintaining an aquarium environment in the absence of plant life. The system uses a biological filter means, a mechanical filtration means, and an algae propagation means.

U.S. Pat. No. 4,894,151, issued to Woltmann, on Jan. 16, 1990, discloses a "Filter Cartridge for an Undergravel Aquarium Filter." This filter cartridge system utilizes an under-gravel suction to pull water through the gravel bed of an aquarium. The water is passed through a charcoal filter before being returned to the upper level of the aquarium.

U.S. Pat. No. 4,995,334, issued to Wechsler, on Feb. 26, 1991, discloses an "Aquarium-Terrarium Tank." This disclosure centers around an aquarium tank with a low wall to provide for installation of a water filtration system. This low wall allows for small body of water and small filtration system while still maintaining a dry land area for amphibians.

U.S. Pat. No. 5,127,366, issued to Kim, on Jul. 7, 1992, discloses an "Aquarium Having Aquaculture Pot and Fountain." The disclosure describes a pot placed on top of an aquarium to filter water from the aquarium. The system uses a motorized water pump to lift water from the tank and into the pot. Gravity then pulls the water through the pot which acts a filter for removing the precipitates, and the water flows out of the pot and back into the aquarium.

U.S. Pat. No. 5,135,400, issued to Ramey, on Aug. 4, 1992, discloses a "Vivarium for Ecosystem Teaching Purposes and Recreational Observation." This enclosure uses partitioned areas for soil, and water to form terrestrial and aquatic environments.

U.S. Pat. No. 5,234,581, issued to Rosenberg, on Aug. 10, 1993, discloses a "Wet/Dry Filtration System Utilizing Mechanical, Biological and Chemical Means." This system teaches a combined oxygen reactor chamber and bacterial chamber to maximize the bacterial bed effectiveness. The system also claims to saturate the water with oxygen to oxidize any chemicals not controlled by the bacteria.

U.S. Pat. No. 5,269,914, issued to Englert, on Dec. 14. 1993, discloses an "Undergravel Filtration System." This system pulls water through a sand or gravel bottom and then passes the water upward past bio-balls to be returned to the aquarium. The system uses the upward movement of air to create the water movement upward past the bio-balls.

U.S. Pat. No. 5,693,220, issued to Sceusa, on Dec. 2, 1997, discloses an "Aquarium Filtration System for Semi-Aquatic Animals." The specification describes the use of a ramp with filtration cartridges to allow for access for an animal between the aquatic and dry environments. The system also teaches the use of a reverse flow and increased flow path for improved filtration.

U.S. Pat. No. 5,957,085, issued to Youngstrom et al., on Sep. 28. 1999, discloses an "Underwater Apparatus for an Aquarium and Related Methods," The novelty of this invention is directed towards the creation of an under water air chamber for access by amphibians and the like.

Thus, the present aquarium market provides very few, if any, proper tools for working terrariums. Even the prior art devices that have been created for aquariums have many disadvantages for the terrarium system. Most of these prior art devices use a large amount of space and take up more room than needed, or these devices utilize expensive water pumps, and the pump systems do not perform well. Furthermore, the varying species kept in a terrarium need an environment that is capable of neutralizing wastes to prevent toxic waste buildup that is not provided by these prior art devices. In addition, the animals that reside in terrariums are fragile and need a low-maintenance or clean and self-sufficient environment to minimize environment disruptions.

What is needed, then, is a terrarium filtering system for providing a low maintenance environment designed to minimize or eliminate the build up of potentially harmful wastes in a terrarium.

SUMMARY OF THE INVENTION

In accordance with the present invention, a terrarium filtering device, apparatus, and method is disclosed which addresses the drawbacks of the prior art devices and in one of its exemplary forms includes a base filtration plate, a barrier wall, and an environment separation cup.

The present invention includes a terrarium filtering system for maintaining a wet environment, a moist environment, and a dry environment within an aquarium tank. The filtering system includes a terrarium filter plate with a barrier wall to separate the wet and moist areas, water flow holes and water movers connected to a bubbling system to provide aeration and create a water flow, and a passive waste neutralization system. The terrarium filter plate is covered with a filtering media and together they act as a filtering device. Waste materials in the water are moved by flowing water to be trapped in the filtering media, and a porous passive neutralization system is used to offset toxins in the water flow.

One object of the present invention is to provide an easily maintainable and inexpensive device for filtering a terrarium environment.

A further object of the present invention is to create a multi-favored environment with at least three living environments. The first environment is a dry area, the second environment is a moist area and the third environment is an aquatic area.

One advantage of the present invention is the use of discrete areas for containing the dry media and maintaining it as a separate area away from the moist and wet environments.

A further advantage of the present invention is the use of a barrier wall divider to separate the moist environment from the aquatic environment.

A still further advantage of the present invention is the use of air line routing holes and guide rods in conjunction with the barrier wall to position the air lines out of sight of the terrarium observer and prevent cluttering of the environments.

Yet another advantage of the present invention is the use of a permeable container filled with neutralizers to clean the water and prevent toxic waste buildup.

A further advantage of the present invention is the use of water movers with a filter plate to create a filtering device.

Other objects and advantages of the present invention and further scope of the applicability of the present invention will be come apparent from the detailed description to follow, taken in conjunction with the accompanying drawings wherein like parts are designated by like reference numerals.

DESCRIPTION OF THE PREFERRED EMBODIMENTS

Figure 1:
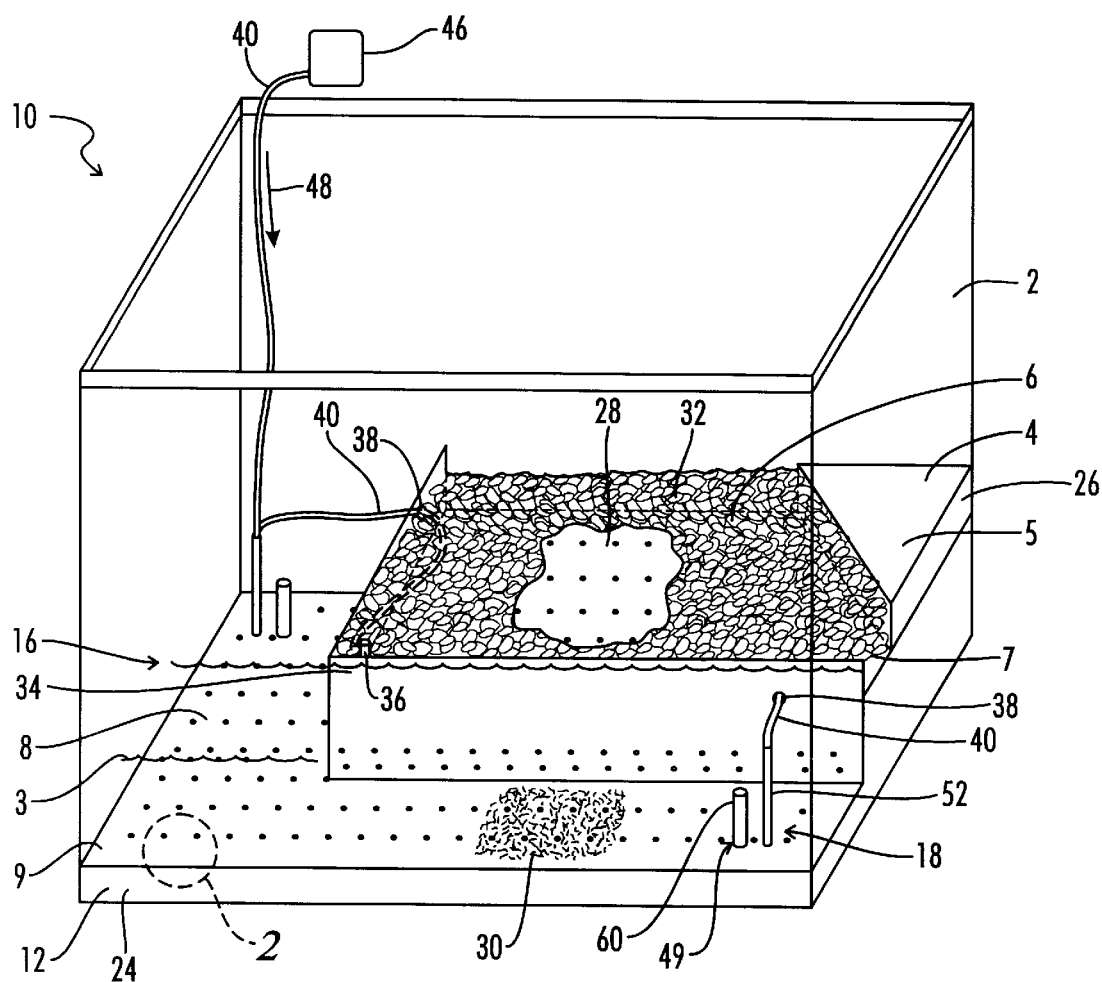
FIG. 1 is an isometric view of the terrarium filter plate of the present invention installed into an aquarium tank.
Figure 2:
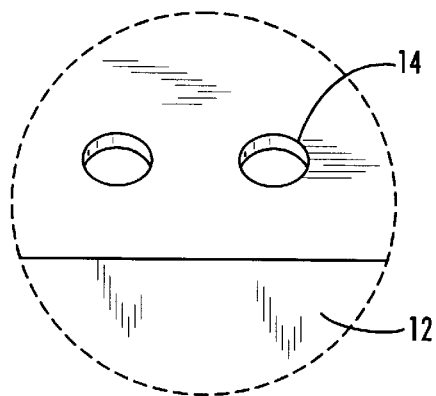
FIG. 2 is a magnified view of the water flow holes in the terrarium filter plate.
Figure 3:
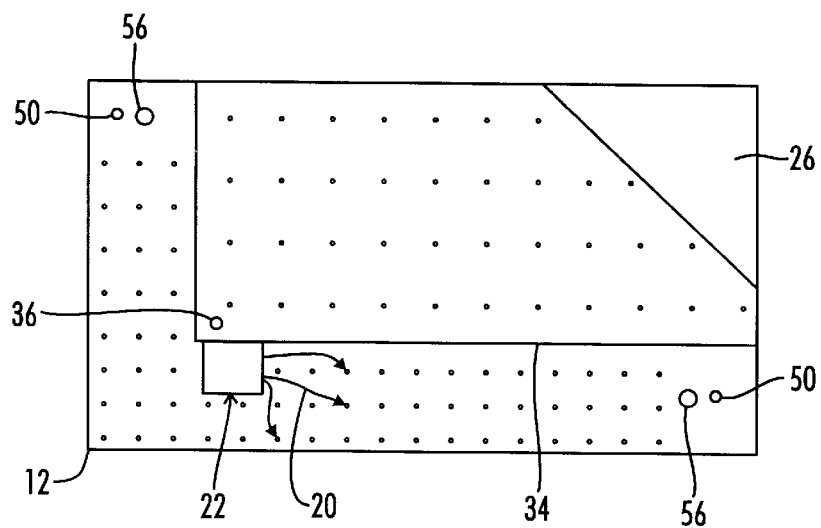
FIG. 3 is a top view of the terrarium filter plate.
Figure 5:
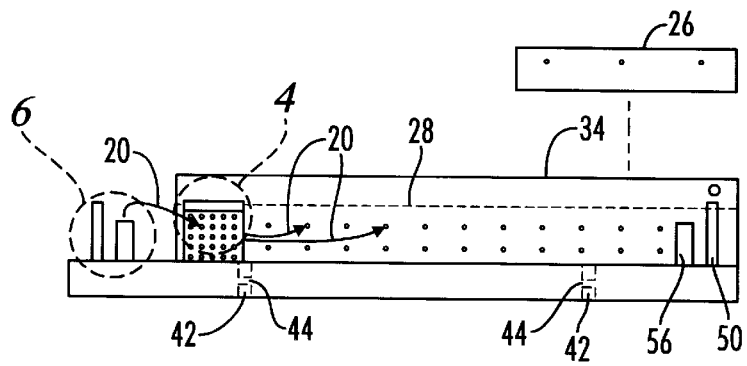
FIG. 5 is a front view of the terrarium filter plate.
Figure 4:
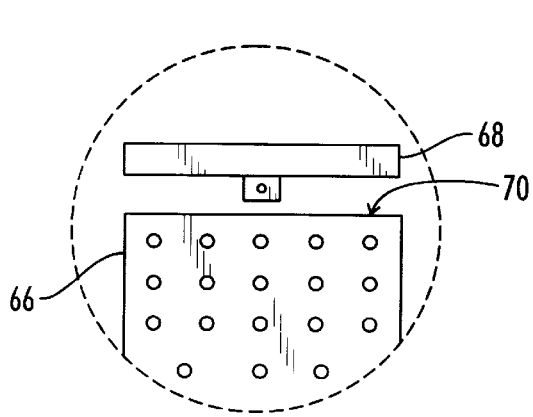
FIG. 4 is a magnified view of the waste neutralizing container of the terrarium filter plate.
Figure 6:
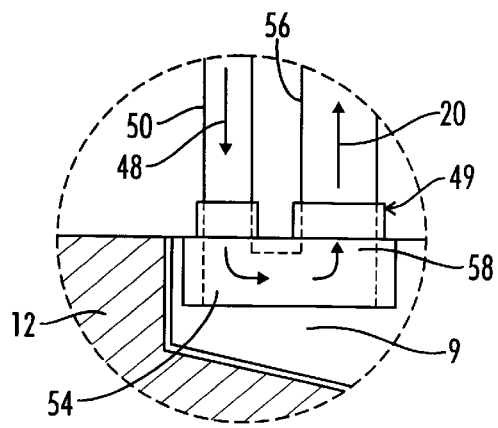
FIG. 6 is a cut away view of the bubbling water mover of the terrarium filter plate.
Figure 7:
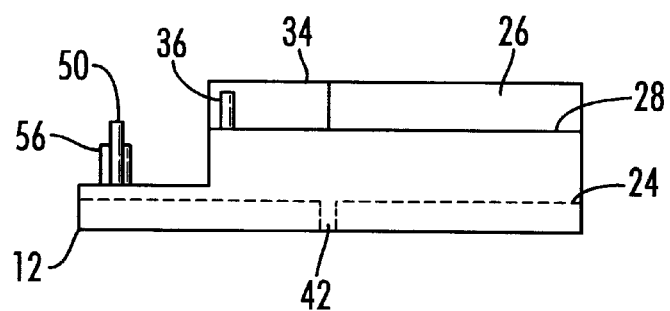
FIG. 7 is a right side view of the terrarium filter plate.
Figure 8:
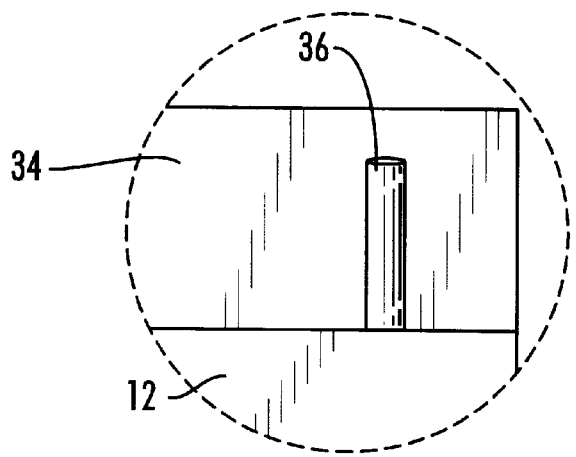
FIG. 8 is a magnified view of the air line guide rod of the terrarium filter plate.
Figure 9:
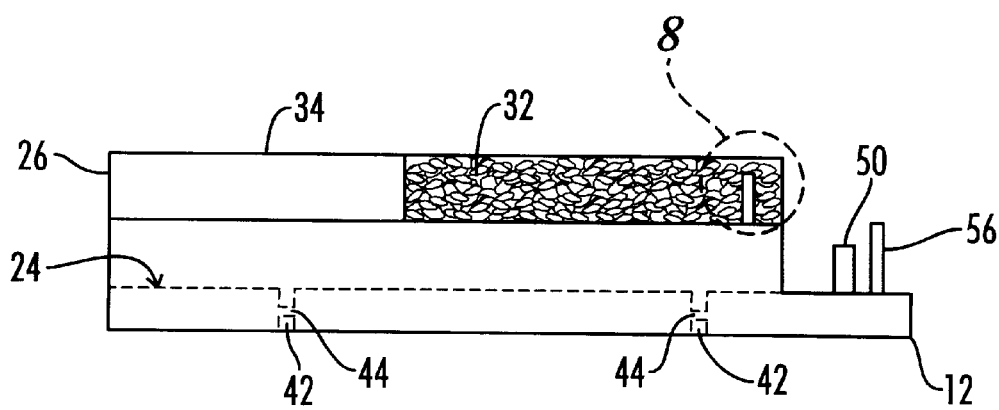
FIG. 9 is a back view of the terrarium filter plate.
Figure 10:
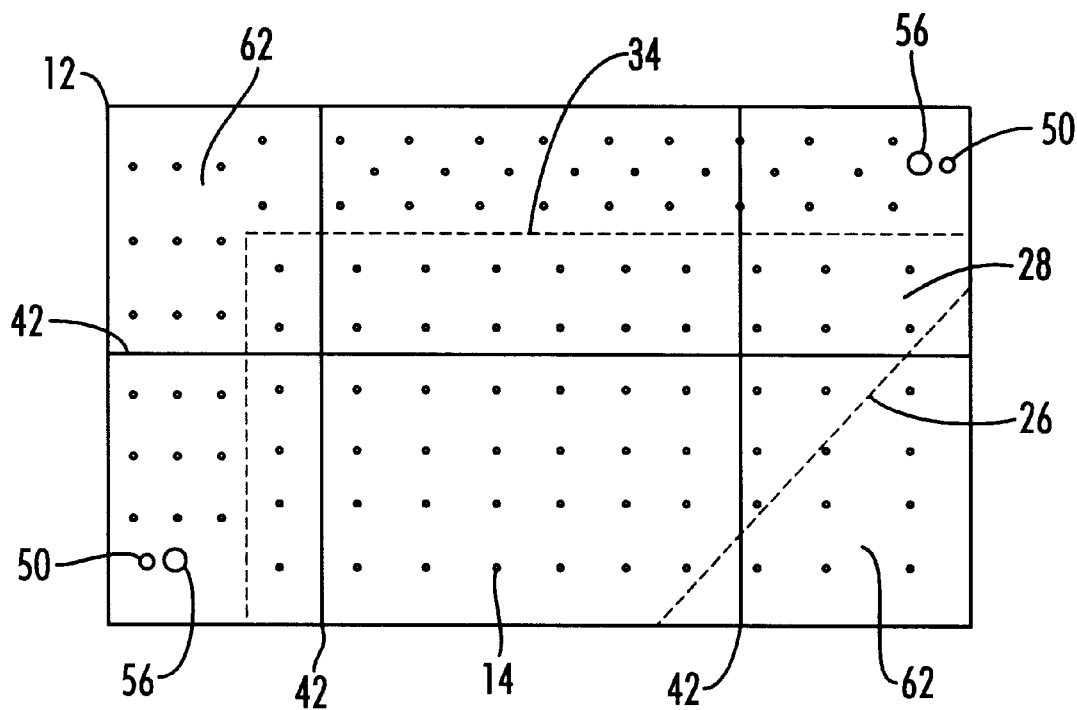
FIG. 10 is a bottom view of the terrarium filter plate.
Figure 11:
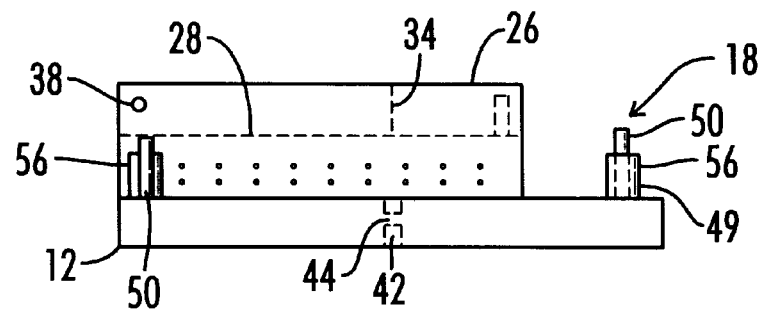
FIG. 11 is a left side view of the terrarium filter plate.

As shown FIG. 1, the present invention is directed toward a device for filtering a terrarium environment tank 2. The terrarium environment tank 2 is a standard aquarium tank set up to provide a terrarium environment. Three types of living conditions are maintained in a terrarium environment tank 2. These living conditions include a dry media environment 4, a moist media environment 6, and an aquatic or wet media environment 8. The moist media environment 6 and aquatic media environment 8 include water 3 as shown. Thus, the terrarium environment 2 is multi-favored to include a dry media environment 4, a moist media environment 6, and an aquatic media environment 8. These environments are established by the first level 9 defining an aquatic area submerged beneath the water 3; the second level 5 defining a dry media area mounted above the water 3; and the third level 7 defining a moist media area mounted at the interface between the wet environment 8 and the dry environment 4.

An exemplary embodiment of the terrarium filtering system 10 of the present can be understood as disclosed in FIGS. 1–11. The present invention includes a terrarium filtering system 10 for maintaining the wet environment 8, a moist environment 6, and a dry environment 4 within a tank 2 is shown. The filtering system 10 includes as major components a terrarium filter plate 12 with water flow holes 14 submerged beneath the water level 16, a bubbling system 18 flowably connected to the terrarium filter plate 12 to provide aeration and create a water flow 20 through the water filtration flow holes 14, and a passive waste neutralization system 22 submerged beneath the water interface level 16 and located in the path of the water flow 20 to neutralize toxic wastes. The terrarium filter plate 12 is a filtering device. The water movers 49 create an upward moving current or water flow 20 in the corners of the filtering plate 12. This water flow 20 at the corners causes a downward water flow 20 through the gravel or filtering media 30, through the holes 14, under the filter plate 12, and back through the water mover 49. In this manner, waste materials in the water 3 will be moved by the water flow 20 into the filtering media 30 where the waste is trapped and broken down naturally. Thus, the water 3 emerging from the water movers 49 has been filtered by both the filtering media 30 and the filter plate 12.

The terrarium filtering system 10 includes a wet environment plate 24 submerged beneath the water interface level 16; a dry environment plate 26 mounted above the water interface level 16; and a moist environment plate 28 mounted at the water interface level 16 between the wet environment 8 and the dry environment 4. A filtering media 30 covers the wet plate 24, and the filtering media 30 can include gravel, sand, or other particulate matter.

A moisture retaining media 32 covers the moist plate 28, to allow for a moist environment 6 to be maintained at the water interface level 16. The moisture retaining media 32 displaces water and maintains a moist area that is neither wet nor dry. A moisture retaining media 32 with a wicking action is appropriate for this application to raise the moisture level without constant water 3 contact of the animal in the terrarium tank 2. In a preferred embodiment, the moisture retaining media 32 is gravel; sand or a sand-like material is not recommended as it may clog the moist plate 28. A barrier wall 34 is used to separate the water interface level 16 between the wet plate 24 and the moist plate 28. This barrier wall 34 reduces the water 3 movement on the moist plate 28 at the water level interface 16. However, water is still allowed to flow through the holes 14 in the moist plate 28 to maintain moisture in the moisture retaining media 32.

The dry media environment 4 can be maintained by the dry plate 26 by forming the dry plate 26 as an environment separation cup with side walls and a bottom. This structure allows for a dry media to be maintained out of the water 3.

The weight of the dry media will maintain the position of the dry plate 26 and keep the dry plate 26 from floating when the water level 16 is above the bottom of the dry plate 26. The dry plate 26 is removable for cleaning purposes or may be permanently removed when appropriate. The dry media should not be a highly absorbent material. In the preferred embodiment, the dry media could be sand, peat, bark chips or gravel.

The terrarium filtering system 10 also includes an air line guide rod 36 mounted in association with the barrier wall 34. The air line guide rod 36 allows for an air line 40 to be run around the inside of the barrier wall 34 and thus, the air line 40 will be hidden from view within the tank 2. Further aiding in the camouflage of the air line 40 are the air line guide holes 38 in the barrier wall 34. These air line guide holes 38 allow for the air line 40 to pass through the barrier wall 34 and remain positioned in the least obtrusive manner to the viewing of the tank 2.

Supporting braces 42 are interconnected to support the filter plate 12. The supporting braces 42 run the full length and width of the filtering plate 12 in the preferred embodiment; however, alternative designs are also anticipated. These supporting braces 42 transfer the weight of the filtering media 30 to the bottom of the tank 2 and may also be used to create different water flow sections 62 for the bubbling system 18. The support braces 42 are equipped with water flow channels 44 for water movement. These water flow channels 44 flowably connect water flow holes 14 to the bubbling system 18 so that water 3 may flow throughout the terrarium filtering system 10 for the removal and neutralization of waste.

The terrarium filtering system 10 also includes a bubbling system 18. This bubbling system 18 includes an aquarium type air pump 46 for providing an air flow 48, and water movers 49. Two water movers 49 are shown with each water mover 49 being mounted at opposite corners of the tank 2. Each water mover 49 creates an upward flow of water 3 at its location. The water movers 49 include a downflow tube 50 with a first end 52 flowably connected to the air pump 46 and a second end 54 submerged beneath the water level 16; and a bubbling tube 56 with an first open end 58 flowably connected to the second end 54 of the downflow tube 50 which is submerged beneath the water level 16. The bubbling tube 56 also includes a second end open 60 to discharge the water flow 20. Thus, it may be seen that airflow 48 from the downflow tube 50 contacts the water 3 and forces the water 3 to flow upward through the bubbling tube 56 to create the water flow 20. Thus, water 3 and waste is pulled down through the filtering media 30 and through the flow holes 14 in the filter plate 12 which traps the waste so as to be naturally neutralized. As shown in the preferred embodiment, the bubbling system 18 may include multiple downflow tubes 50 which are flowably connected to bubbling tubes 56 to provide for a plurality of water flow sections 62.

Also used in the terrarium filtering system 10 is a passive waste neutralization system 22. Since the buildup of toxic wastes occurs first in the water 3, a permeable or porous waste neutralizing container 66 having been filled with carbon and ammonia neutralizers will clean the water 3 and prevent toxic waste buildup. The passive waste neutralization system 22 includes a porous waste neutralizing container 66 with a lid 68. The passive waste neutralization container 68 is manufactured from a porous plastic and is filled with a waste neutralizing material 70, such as carbon or ammonia neutralizers. In particular, the following commercially available materials may be used for waste neutralizing material 70: Floss, Zeolite (to neutralize ammonia), PhosGuard (to neutralize phosphates), DeNitrate (to neutralize nitrates) or charcoal. Other products are available to reduce hard metals and other impurities. When the action of the passive neutralization system 22 is combined with the filtration action of the bubbling system 18 producing a water flow 20 through the filtration media 30 and the filter plate 12, a maintained terrarium environment is achieved which requires little maintenance or upkeep.

Thus, although there have been described particular embodiments of the present invention of a new and usefuil Terrarium Filter Plate, it is not intended that such references be construed as limitations upon the scope of this invention except as set forth in the following claims.

What is claimed is:

1. A terrarium filtering system for maintaining a wet environment with a water level, a moist environment, and a dry environment within a tank, comprising:

a terrarium filter plate with water flow holes submerged beneath the water level;

a bubbling system flowably connected to the terrarium filter plate to provide aeration and create a water flow through the water flow holes;

a passive waste neutralization system including carbon and ammonia neutralizers submerged beneath the water level and located in the path of the water flow to neutralize toxic wastes;

a wet environment plate submerged beneath the water interface level;

a dry environment plate mounted above the water interface level; and a horizontal moist environment plate mounted at the water level interface between the wet environment and the dry environment.

2. The terrarium filtering system of claim 1, including a filtering media covering the wet plate.

3. The terrarium filtering system of claim 2, wherein the filtering media is gravel.

4. The terrarium filtering system of claim 1, including a moisture retaining media with a wicking action covering the moist plate.

5. The terrarium filtering system of claim 1, including a barrier wall separating the wet plate and the moist plate to reduce water movement on the moist plate at the water level interface.

6. The terrarium filtering system of claim 5, including an air line guide rod mounted in association with the barrier wall.

7. The terrarium filtering system of claim 5, the barrier wall including air line guide holes.

8. A terrarium filtering system for maintaining a wet environment with a water level, a moist environment, and a dry environment within a tank, comprising:

a terrarium filter plate with water flow holes submerged beneath the water level;

a bubbling system flowably connected to the terrarium filter plate to provide aeration and create a water flow through the water flow holes;

a passive waste neutralization system including carbon and ammonia neutralizers submerged beneath the water level and located in the path of the water flow to neutralize toxic wastes;

a first, second, and third levels;

the first level defining an aquatic area submerged beneath the water level;

the second level defining a dry media area mounted above the water level; and the third level defining a horizontal moist media area mounted at the interface between the wet environment and the dry environment.

* * * * *